United States Patent
Lee et al.

(10) Patent No.: US 12,482,830 B2
(45) Date of Patent: Nov. 25, 2025

(54) METHOD AND APPARATUS FOR MANUFACTURING MEMBRANE-ELECTRODE ASSEMBLY

(71) Applicants: Hyundai Motor Company, Seoul (KR); Kia Corporation, Seoul (KR)

(72) Inventors: Seung Hyun Lee, Daejeon (KR); Jutae Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 453 days.

(21) Appl. No.: 18/307,572

(22) Filed: Apr. 26, 2023

(65) Prior Publication Data

US 2024/0170684 A1    May 23, 2024

(30) Foreign Application Priority Data

Nov. 17, 2022  (KR) .......................... 10-2022-0154261

(51) Int. Cl.
*H01M 4/88*      (2006.01)
*H01M 8/1004*    (2016.01)

(52) U.S. Cl.
CPC ....... *H01M 4/8828* (2013.01); *H01M 8/1004* (2013.01)

(58) Field of Classification Search
CPC .. H01M 4/881; H01M 4/8828; H01M 4/8882; H01M 8/1004; Y02P 70/50
USPC .......................................................... 156/231
See application file for complete search history.

(56) References Cited

U.S. PATENT DOCUMENTS 10,147,962 B2 * 12/2018 Yokoi .................... B32B 37/10

FOREIGN PATENT DOCUMENTS

KR           20220072155 A       6/2022

* cited by examiner

*Primary Examiner* — James D Sells
(74) *Attorney, Agent, or Firm* — Slater Matsil, LLP

(57) ABSTRACT

An embodiment method of manufacturing a membrane-electrode assembly includes feeding an electrolyte membrane by a feeding device, applying a catalyst slurry to manufacture a first electrode onto a surface of the electrolyte membrane by an applicator, while feeding the electrolyte membrane by the feeding device, performing drying of the catalyst slurry and heat treatment of the first electrode by applying heat to the electrolyte membrane by temperature control devices, while feeding the electrolyte membrane by the feeding device, and transferring a second electrode to a remaining surface of the electrolyte membrane discharged from the feeding device, opposite to the surface of the electrolyte membrane having the first electrode bonded thereto, by a transfer device.

20 Claims, 3 Drawing Sheets

OCCURRENCE OF PROBLEMS IN INTERFACIAL RESISTANCE AND AIRTIGHTNESS DUE TO SPACE FORMATION

WEAK PART — OCCURRENCE OF WATER BUBBLES

METHOD AND APPARATUS FOR MANUFACTURING MEMBRANE-ELECTRODE ASSEMBLY

CROSS-REFERENCE TO RELATED APPLICATIONS

This application claims the benefit of Korean Patent Application No. 10-2022-0154261, filed on Nov. 17, 2022, which application is hereby incorporated herein by reference.

TECHNICAL FIELD

The present disclosure relates to a method and apparatus for manufacturing a membrane-electrode assembly (MEA).

BACKGROUND

Fuel cells are apparatuses which produce electrical energy through electrochemical reaction between fuel and oxygen, have advantages, such as high energy density and output, and may thus be used not only to supply power to home and industrial products but also to supply power for driving vehicles and to supply power to small-sized electrical and electronic products, portable devices, etc.

Fuel cells, which are now known, may be divided into polymer electrolyte membrane (PEM) fuel cells, phosphoric acid fuel cells, molten carbonate fuel cells, solid oxide fuel cells, etc. depending on kinds of used electrolytes.

Further, the operating temperatures of the fuel cells and the materials of components of the fuel cells are varied depending on the kinds of used electrolytes. The PEM fuel cells are widely known as fuel cells for vehicles.

A fuel cell stack, which substantially produces electricity in a fuel cell system, is formed by stacking several to tens or more unit cells, each of which includes an MEA, gas diffusion layers (GDLs), separators (also referred to as bipolar plates), gaskets, etc.

The MEA is formed by stacking electrodes including catalysts on both surfaces of a PEM including a proton conducting polymer, and has a structure in which two catalyst electrodes, i.e., an anode (also referred to as a fuel electrode or an oxidation electrode) and a cathode (also referred to as an air electrode or a reduction electrode), are located on both surfaces of the PEM.

As the principle of producing electricity in a fuel cell, when fuel (hydrogen) is supplied to the anode, the fuel is adsorbed onto the catalyst of the anode and oxidized to generate protons and electrons, and the electrons flow to the cathode through an external circuit. Such a flow of the electrons is called the current generated and output by the fuel cell.

The protons migrate to the cathode through the PEM, an oxidizer (oxygen) is supplied to the cathode, and the protons and the electrons react on the catalyst of the cathode, and thus generate water.

When reaction gases are not smoothly supplied due to flooding or ice formation in winter in the fuel cell, when the demanded load of the fuel cell is suddenly increased during operation of the fuel cell, or in operating conditions, such as start-up of the fuel cell, reverse voltage may occur.

In this case, carbon oxidation reaction (COR) occurs at the anode, where hydrogen oxidation reaction has to occur, due to shortage in hydrogen supply, and may thus cause sudden performance deterioration and corrosion of the MEA.

Further, when a water electrolysis catalyst, such as an iridium oxide catalyst, is added as a withstand reverse voltage catalyst in order to prevent reverse voltage, the COR, other oxidation reactions, and corrosion of the MEA may be prevented through water ($H_2O$) electrolysis in the MEA.

However, since increase in raw material prices of withstand reverse voltage catalysts causes a rise in costs, technology for manufacturing the MEA which may show the maximum effect using the minimum amount of a withstand reverse voltage catalyst is required.

In order to manufacture the MEA of the fuel cell, catalyst slurries including catalyst metals, such as platinum, are prepared, electrodes for fuel cells having a designated thickness are manufactured using the prepared catalyst slurries, and the manufactured electrodes are bonded to both surfaces of an electrolyte membrane.

Heat treatment of the MEA changes the degrees of crystallinity of the electrodes and the electrolyte membrane of the MEA, and thus changes the structure and characteristics of triple phase boundaries. Since heat treatment may improve durability of the MEA, most manufacturers manufacture MEAs through heat treatment.

A conventional heat treatment process is executed with respect to the entirety of the MEA and is a post-treatment process which is distinguished from drying of the electrodes. In the MEA which is a target to be heat-treated, the electrolyte membrane is located between two sub-gaskets, and thus, water is not easily discharged, and water bubbles occur during wet-dry processes.

Further, in the case that the electrodes and the electrolyte membranes are individually heat-treated and then the electrodes are transferred to the electrolyte membrane in the same manner as the conventional method, a transfer pressure and temperature should be increased due to reduced transferability depending on crystallization of respective materials, thereby damaging electrode structures.

FIG. 1A is a longitudinal-sectional view illustrating problems of a fuel cell manufactured by conventional technology, and concretely, showing the configuration of a unit cell. An anode (AN) 2 and a cathode (CA) 3 are stacked on both surfaces of an electrolyte membrane 1, and sub-gaskets (SGs) 4 are fixed to both surfaces of the electrolyte membrane 1 at the outer parts of the anode 2 and the cathode 3 by an adhesive 4a. Further, gas diffusion layers (GDLs) 6 are fixed to the sub-gaskets 4 by an adhesive 5.

In the above configuration of the unit cell, as shown in FIG. 1A, problems in interfacial resistance and airtightness may occur due to spaces formed by the gas diffusion layers 6, the sub-gaskets 4, the anode 2, and the cathode 3. Further, as shown in FIG. 1B, water bubbles may occur in spaces between the electrolyte membrane 1 and the sub-gaskets 4.

The above information disclosed in this background section is only for enhancement of understanding of the background of embodiments of the invention and therefore it may contain information that does not form the prior art that is already known to a person of ordinary skill in the art.

SUMMARY

The present disclosure relates to a method and apparatus for manufacturing a membrane-electrode assembly (MEA). Particular embodiments relate to a method and apparatus for manufacturing an MEA for fuel cells having improved withstand reverse voltage performance.

Embodiments of the present invention can solve problems associated with the prior art, and embodiments of the present invention provide a method and apparatus for manufacturing a membrane-electrode assembly (MEA) for fuel cells which may improve the withstand reverse voltage performance of the MEA, may achieve cost reduction and manufacturing time reduction, and may improve occurrence of water bubbles.

One embodiment of the present invention provides a method of manufacturing a membrane-electrode assembly (MEA), including feeding an electrolyte membrane by a feeding device, applying a catalyst slurry configured to manufacture one electrode of a cathode and an anode onto one surface of the electrolyte membrane by an applicator, while feeding the electrolyte membrane by the feeding device, performing drying of the catalyst slurry and heat treatment of the electrode by applying heat to the electrolyte membrane by temperature control devices, while feeding the electrolyte membrane by the feeding device, and transferring a remaining electrode of the cathode and the anode to a remaining surface of the electrolyte membrane discharged from the feeding device, opposite to the surface of the electrolyte membrane having the electrode bonded thereto, by a transfer device so as to manufacture the MEA.

Another embodiment of the present invention provides an apparatus for manufacturing an MEA including a feeding device configured to feed an electrolyte membrane, an applicator configured to apply a catalyst slurry configured to manufacture one electrode of a cathode and an anode onto one surface of the electrolyte membrane, while feeding the electrolyte membrane by the feeding device, temperature control devices configured to simultaneously perform drying of the catalyst slurry and heat treatment of the electrode by applying heat to the electrolyte membrane, while feeding the electrolyte membrane by the feeding device, and a transfer device configured to transfer a remaining electrode of the cathode and the anode to a remaining surface of the electrolyte membrane discharged from the feeding device, opposite to the surface of the electrolyte membrane having the electrode bonded thereto.

Other aspects and preferred embodiments of the invention are discussed infra.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein.

Figure 1A:
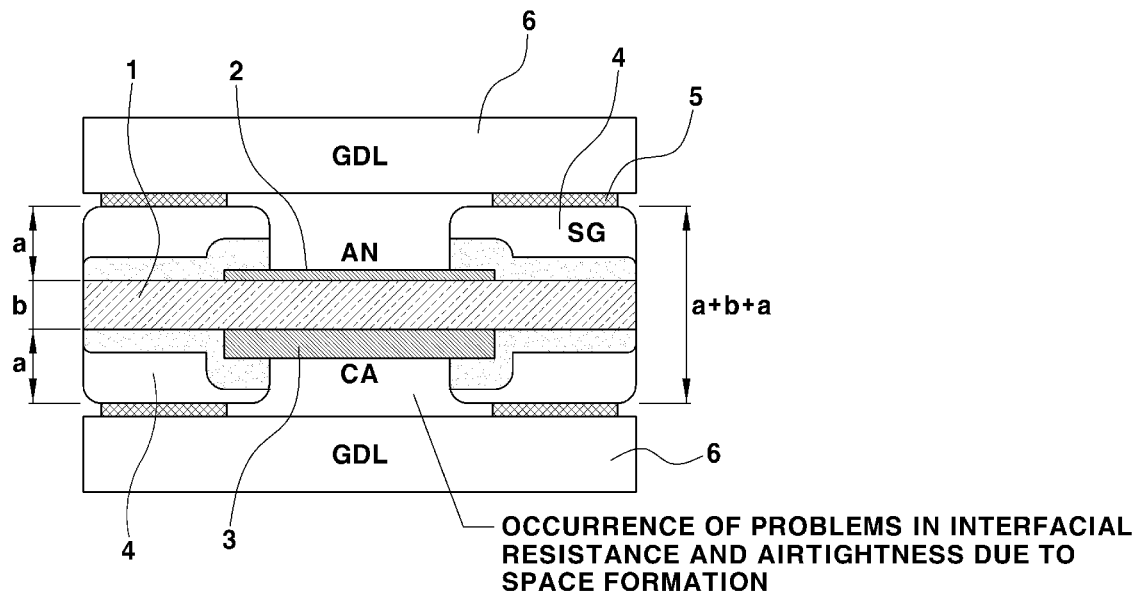
FIGS. 1A and 1B are views illustrating problems of a fuel cell manufactured by conventional technology.
Figure 1B:
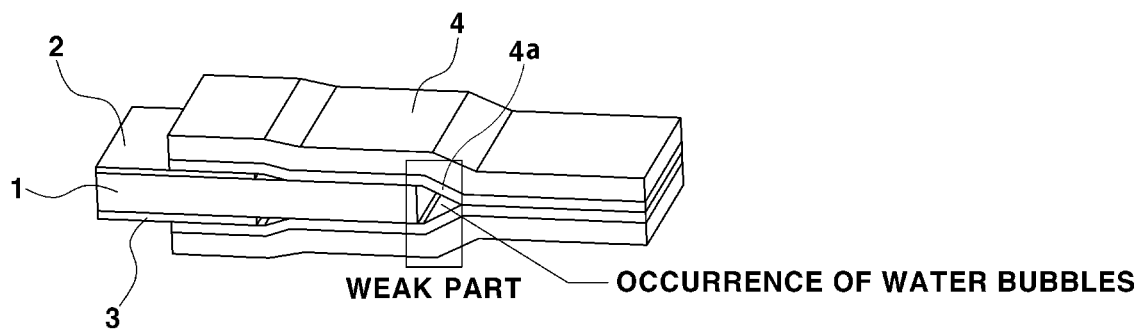

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes, will be determined in part by the particular intended application and use environment.

In the figures, reference numbers refer to the same or equivalent parts of embodiments of the present invention throughout the several figures of the drawings.

DETAILED DESCRIPTION OF ILLUSTRATIVE EMBODIMENTS

Hereinafter, exemplary embodiments of the present invention will be described in detail with reference to the accompanying drawings. Specific structural or functional descriptions in embodiments of the present invention set forth in the description which follows will be exemplarily given to describe the embodiments of the present invention, and the present invention may be embodied in many alternative forms. Further, it will be understood that the present invention should not be construed as being limited to the embodiments set forth herein, and the embodiments of the present invention are provided only to completely disclose the invention and cover modifications, equivalents, or alternatives which come within the scope and technical range of the invention.

In the following description of the embodiments, terms such as "first" and "second" are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

Wherever possible, the same reference numbers will be used throughout the drawings to refer to the same or like parts. The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Embodiments of the present invention relate to a method and apparatus for manufacturing a membrane-electrode assembly (MEA) for fuel cells which may improve the withstand reverse voltage performance of the MEA, may achieve cost reduction and manufacturing time reduction, and may improve occurrence of water bubbles.

Conventionally, an integrated MEA in which electrodes (a cathode and an anode) are bonded to both surfaces of an electrolyte membrane was manufactured by manufacturing electrodes by applying catalyst slurries for electrodes to release papers, drying the catalyst slurries and heat-treating the dried catalyst slurries, and then transferring the manufactured electrodes to the electrolyte membrane.

In embodiments of the present invention, an MEA is manufactured by applying a catalyst slurry for electrodes directly to an electrolyte membrane and then simultaneously performing drying and heat treatment processes on the catalyst slurry, thereby solving various problems occurring in the conventional method in which the electrodes are individually manufactured by heat treatment and are then transferred to the electrolyte membrane.

Figure 2:
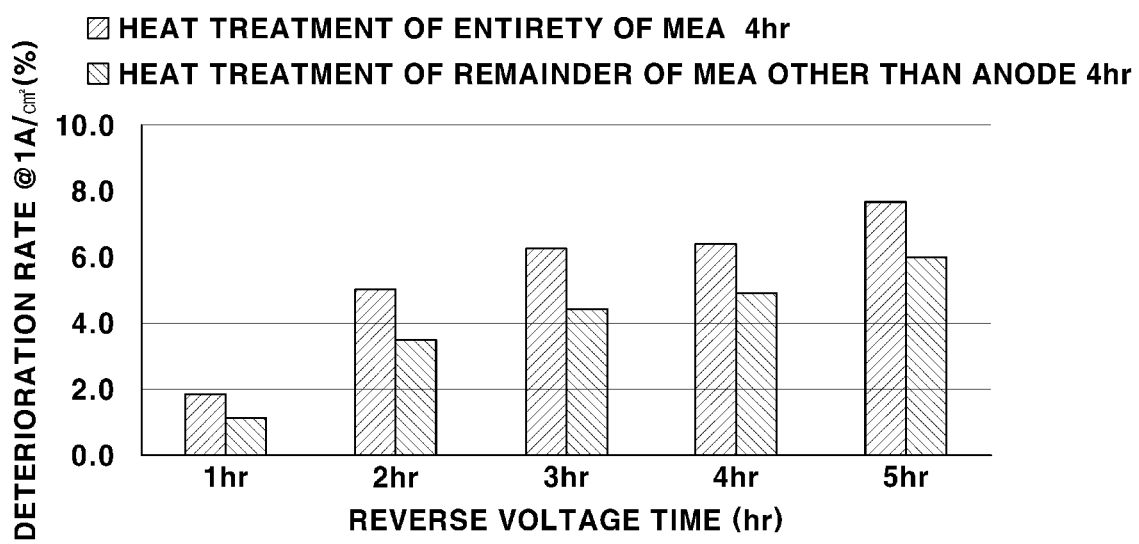
FIG. 2 is a graph comparatively representing deterioration rates of a membrane-electrode assembly, the entirety of which is heat-treated, and a membrane-electrode assembly, a part of which is heat-treated.

FIG. 2 shows that an MEO, the remaining part of which other than an anode is heat-treated, has improved withstand reverse voltage performance, compared to an MEA, the entirety of which is heat-treated.

Referring to FIG. 2, it may be confirmed that, although the MEAs are heat-treated for the same time (4 hours), the MEA, only a part of which (i.e., the remainder of which other than an anode) is heat-treated, exhibits a lower deterioration rate than the MEA, the entirety of which is heat-treated, under the same reverse voltage time conditions.

Therefore, the partial heat treatment method of the MEA rather than the full heat treatment method of the MEA needs to be considered, and a method of manufacturing an MEA which may shorten the manufacturing time of the MEA compared to the conventional method is also required.

Figure 3:
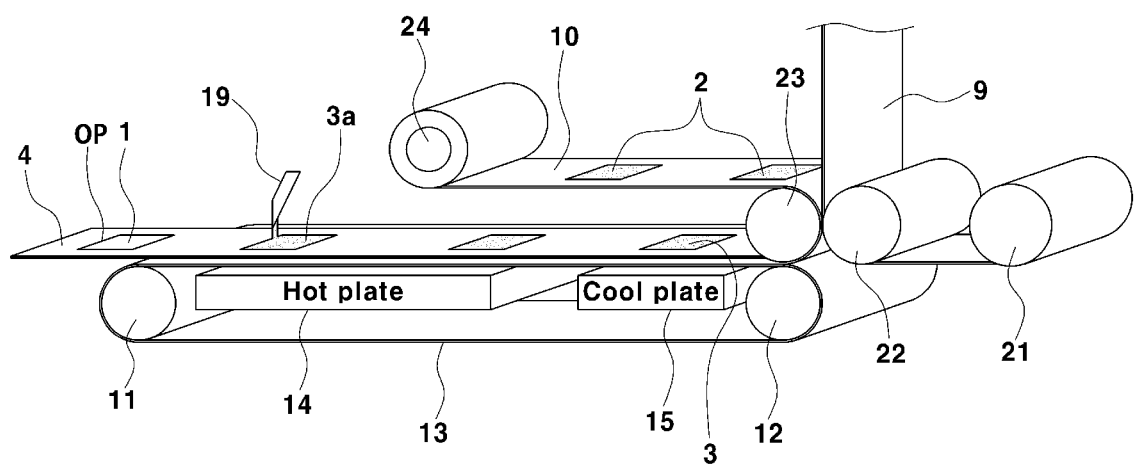
FIG. 3 is a view showing main elements of an apparatus for manufacturing a membrane-electrode assembly according to one embodiment of the present invention.
Figure 4:
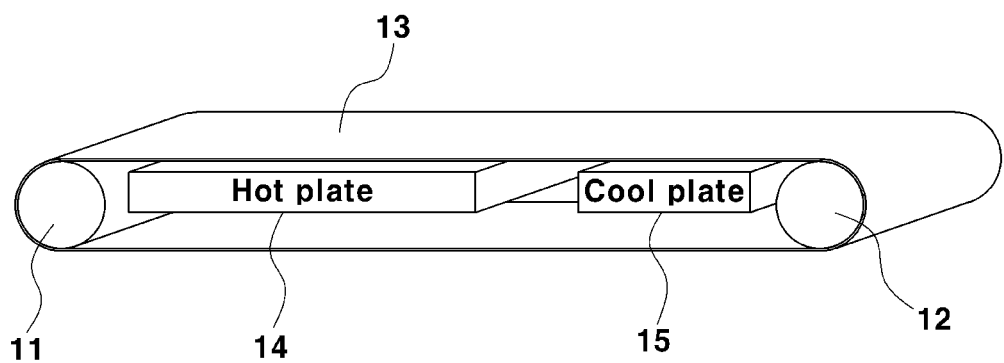
FIG. 4 is a view showing temperature control devices of the apparatus according to one embodiment of the present invention.
Figure 5:
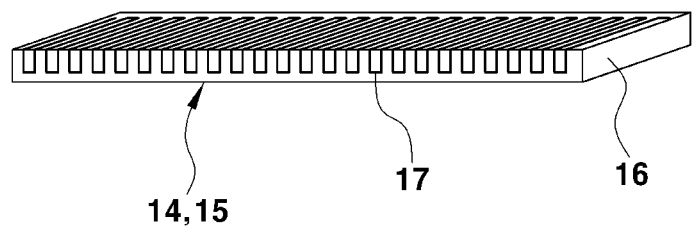
FIG. 5 is a view showing one example of a temperature control plate of the temperature control device according to one embodiment of the present invention.

FIG. 3 is a view showing main elements of an apparatus for manufacturing an MEA according to one embodiment of the present invention. FIG. 4 is a view showing temperature control devices of the apparatus according to one embodiment of the present invention, and FIG. 5 is a view showing one example of a temperature control plate of the temperature control device according to one embodiment of the present invention.

FIG. 3 shows a continuous process of manufacturing a membrane-electrode assembly (MEA) 10 and shows the configuration of an apparatus for manufacturing the MEA 10 by sequentially performing a process of directly coating an electrolyte membrane 1 with a catalyst slurry 3a, a heat treatment process of an electrode part (among a cathode and an anode, only the cathode is heat-treated), and a process of transferring an electrode (the anode).

In the following description, the "cathode" is a catalyst electrode bonded and fixed to one surface of the electrolyte membrane 1 and refers to a catalyst layer (i.e., a cathode catalyst layer) manufactured by applying the catalyst slurry 3a to one surface of the electrolyte membrane 1 and then drying the catalyst slurry 3a.

The "anode" is a catalyst electrode bonded and fixed to the other surface of the electrolyte membrane 1 opposite to the surface of the electrolyte membrane 1, on which the cathode 3 is stacked, and refers to a catalyst layer (i.e., an anode catalyst layer) stacked on the other surface of the electrolyte membrane 1 through transfer.

The MEA 10 includes the polymer electrolyte membrane 1 configured to conduct protons, an anode 2 and a cathode 3 formed on both surfaces of the electrolyte membrane 1 by applying catalysts configured to allow hydrogen, which is fuel gas, and air (or oxygen), which is oxidizer gas, to react with each other, and a sub-gasket 4 bonded to the outer periphery of the active area of the electrolyte membrane 1.

The MEA 10 has an area in which electrochemical reaction occurs as an area in which the anode 2 and the cathode 3 are bonded to the electrolyte membrane 1, i.e., the active area to which the fuel gas and the oxidizer gas are supplied so that fuel cell reaction occurs therein.

The cathode 3 and the anode 2 are bonded to both surfaces of the electrolyte membrane 1, and the area in which the cathode 3 and the anode 2 are bonded to the electrolyte membrane 1 becomes the active area in which the fuel cell reaction occurs.

In a process of manufacturing the MEA 10 according to embodiments of the present invention, the sub-gasket 4 is bonded to the surface of the electrolyte membrane 1 to which the cathode 3 is bonded and is not bonded to the other surface of the electrolyte membrane 1 to which the anode 2 is bonded.

In order to achieve firm bonding between the electrolyte membrane 1 and the sub-gasket 4, the electrolyte membrane 1 is manufactured to have a size and structure in which the electrolyte membrane 1 extends outwards from the reaction area of each unit cell of a fuel cell, in which the cathode 3 and the anode 2 substantially used in the electrochemical reaction of the fuel cell are bonded to the electrolyte membrane 1, and the sub-gasket 4 is bonded to the outer part, i.e., the extending part, of the surface of the electrolyte membrane 1, to which the cathode 3 is bonded.

That is, the sub-gasket 4 is bonded to the outer part of the surface of the electrolyte membrane 1 to which the cathode 3 is bonded, outside the reaction area, and the sub-gasket 4 is not bonded to the surface of the electrolyte membrane 1 to which the anode 2 is bonded. The sub-gasket 4 is applied to only one of both surfaces of the electrolyte membrane 1.

Referring to FIG. 3, it may be confirmed that the sub-gasket 4 is bonded and fixed to the remainder of one surface of the electrolyte membrane 1, fed to an electrode manufacturing process, other than the predetermined reaction area of each unit cell of the fuel cell.

In the state in which the sub-gasket 4 is bonded to one surface of the electrolyte membrane 1, the sub-gasket 4 bonded to one surface of the electrolyte membrane 1 has a rectangular opening OP formed at the center thereof, and an area corresponding to the rectangular opening OP serves as the reaction area on which the cathode 3 is stacked.

When the electrolyte membrane 1 configured such that the sub-gasket 4 is bonded to the outer part of one surface thereof is continuously fed to the electrode manufacturing process, an applicator 19 applies the catalyst slurry 3a directly to one surface of the electrolyte membrane 1 through the opening OP of the sub-gasket 4.

Here, the catalyst slurry 3a is used to manufacture the cathode 3, the composition of the catalyst slurry 3a is not different from the composition of a known catalyst slurry, and, in embodiments of the present invention, the catalyst slurry 3a is not limited to a specific composition.

Further, the applicator 19 may be a slot-die which applies the catalyst slurry 3a onto the surface of the electrolyte membrane 1 exposed by the opening OP of the sub-gasket 4 to a designated thickness or a spray device which sprays the catalyst slurry 3a.

As described above, the cathode 3 may be manufactured by applying the catalyst slurry 3a for manufacturing the cathode 3 onto the surface of the electrolyte membrane 1 exposed by the opening OP of the sub-gasket 4 (the surface of the electrolyte membrane 1 to which the sub-gasket 4 is not bonded) using slot-die coating or spray coating and simultaneously performing both drying and heat treatment through a heater 14.

Referring to FIG. 3, drying and heat treatment of the catalyst slurry 3a are performed after application of the catalyst slurry 3a onto the surface of the electrolyte membrane 1 by the applicator 19, but, among the temperature control devices, the heater 14 supplies heat even in a section in which the catalyst slurry 3a is applied to the surface of the electrolyte membrane 1, and thus, it may be thought that application and coating, drying, and heat treatment of the catalyst slurry 3a are substantially almost simultaneously performed.

While the electrolyte membrane 1 having the catalyst slurry 3a applied thereonto is fed by a feeding device having the temperature control devices 14 and 15, drying and heat treatment of the catalyst slurry 3a are simultaneously performed by the temperature control devices, and thereby, among the electrodes of the electrolyte membrane 1, the cathode 3 may be manufactured.

Here, the feeding device may be a conveyor belt system which conveys the electrolyte membrane 1 placed thereon. Although FIGS. 3 and 4 schematically illustrate only main elements of the conveyor belt system, the configuration of the conveyor belt system is well known to those skilled in the art and the conveyor belt system is an industrially well-known system, and thus, a detailed description of the configuration of the conveyor belt system will be omitted.

In embodiments of the present invention, the conveyor belt system is not limited to a specific configuration, and one example of the main elements of the conveyor belt system will be described in brief. The conveyor belt system according to one embodiment of the present invention includes a first pulley 11 which is a driving pulley installed at an entrance of the conveyor belt system and driven by rotational force transmitted from a motor (not shown) through a power transmission mechanism (not shown), a second pulley 12 installed at an exit of the conveyor belt system so as to be rotatable, and a conveyor belt 13 installed to connect the first pulley 11 and the second pulley 12 and moved by the rotational force transmitted from the first pulley 11.

Further, although not shown in the drawings, the conveyor belt system includes a support or a frame, and the first pulley 11 and the second pulley 12 are installed on the support or the frame by brackets so as to be rotatable.

Here, the second pulley 12 may be a driven pulley which supports the conveyor belt 13 or may also be a driving pulley which is driven by rotational force transmitted from a motor. Here, the first pulley 11 and the second pulley 12 must be controlled so as to be rotated at the same speed in the same direction.

Further, the conveyor belt system may include a plurality of rollers (not shown) installed so as to be disposed in a feeding direction by the conveyor belt 13. The plurality of rollers may be installed on the support or the frame so as to be rotatable and may be disposed in the feeding direction by the conveyor belt 13 at regular intervals.

Among the elements of the conveyor belt system according to embodiments of the present invention, the conveyor belt 13 and the plurality of rollers may be manufactured using a material having excellent thermal conductivity, and respective temperature control plates of the temperature control devices 14 and 15, which will be described below, may also be manufactured using a material having excellent thermal conductivity.

Further, the temperature control plates according to one embodiment of the present invention include a hot plate configured to heat-treat the cathode 3 while drying the catalyst slurry 3a applied to one surface of the electrolyte membrane 1 and a cool plate configured to cool the electrolyte membrane 1 and the cathode 3 after drying and heat treatment of the cathode 3.

In embodiments of the present invention, the catalyst slurry 3a is applied directly onto the surface of the electrolyte membrane 1, drying of the catalyst slurry 3a and heat treatment of the cathode 3 are simultaneously performed by the heater 14, and more concretely, application and drying of the catalyst slurry 3a and heat treatment of the cathode 3 are performed in succession while feeding the electrolyte membrane 1 by the conveyor belt system.

In embodiments of the present invention, among the electrodes of the MEA, only the cathode 3 is manufactured by applying and drying the catalyst slurry 3a and is heat-treated. Here, the hot plate of the heater 14 is an element configured to supply heat during a partial heat treatment process, i.e., a process of heat-treating only the cathode 3.

Further, the cool plate of the cooler 15 is an element configured to cool the electrolyte membrane 1 and the electrode (i.e., the cathode 3) after heat treatment and rapidly cools the electrolyte membrane 1 and the cathode 3 after heat treatment.

Among the temperature control devices according to embodiments of the present invention, the heater 14 may be configured to control a heating temperature and a heating rate and the cooler 15 may be configured to control a cooling temperature and a cooling rate.

Further, the hot plate of the heater 14 according to embodiments of the present invention may be configured such that wires 17 are heating wires and are installed in a plate 16 that is a hot plate, as shown in FIG. 5, and a controller, which is not shown, may control supply of current to the wires 17 through a driving circuit (not shown) so as to control operation of the hot plate.

Moreover, the cool plate of the cooler 15 according to embodiments of the present invention may be configured such that wires 17 are cooling wires through which a low-temperature cooling fluid passes and are installed in the plate 16 that is a cool plate, and the controller may control supply of the cooling fluid so as to control operation of the cool plate. Here, the cooling fluid may be a known refrigerant, and a cooling system, which supplies a low-temperature refrigerant using a refrigeration cycle, may be used.

The controller may be configured to control the overall operation of the apparatus according to embodiments of the present invention and may control operation of not only the temperature control devices 14 and 15 but also the feeding device, operation of the applicator 19 configured to apply the catalyst slurry 3a, and operation of a transfer device, which will be described below.

The controller may control the feeding rate of the conveyor belt 13, the heating rate and the heat treatment temperature (i.e., the heating temperature) by the heater 14, the cooling rate and the cooling temperature by the cooler 15, the application rate and the application thickness of the catalyst slurry 3a, etc. Further, the conveyor belt 13 of the conveyor belt system according to embodiments of the present invention may be controlled to have a proper length.

The transfer device includes an electrode roll 21 configured such that a release paper 9 having the anode 2 fixed thereto is wound thereon and rotated to unwind the release paper 9 having the anode 2 fixed thereto, and a pair of pressing rolls 22 and 23 configured to allow the release paper 9 unwound from the electrode roll 21 and the electrolyte membrane 1 discharged from the conveyor belt system to pass therebetween so as to transfer the anode 2 from the release paper 9 to the surface of the electrolyte membrane 1 through compression.

The anode 2 may be manufactured by applying a catalyst slurry onto the release paper 9 and then drying the catalyst slurry, and the catalyst slurry is applied onto a part of one surface of the release paper 9 having a size corresponding to the reaction area to a designated thickness and is then dried.

In application of the catalyst slurry for manufacturing the anode 2, slot-die coating or spray coating may be used. In embodiments of the present invention, the composition of the catalyst slurry configured to manufacture the anode 2 is not different from the composition of a known catalyst slurry, and a detailed description of the composition of the catalyst slurry will be omitted.

Referring to FIG. 3, after the drying, heat-treatment, and cooling processes have been completed, the electrolyte membrane 1 having the cathode 3 applied thereonto is fed into the transfer device and passes through a gap between the pair of pressing rolls 22 and 23 so that the feeding of the electrolyte membrane 1 is changed to the upward direction. Here, the electrolyte membrane 1 is set so that the surface of the electrolyte membrane 1 to which the anode 2 is transferred by the pair of pressing rolls 22 and 23 is opposite to the surface of the electrolyte membrane 1 to which the cathode 3 is bonded.

That is, the anode 2 is transferred to the other surface of the electrolyte membrane opposite to the surface of the electrolyte membrane 1 to which the cathode 3 is bonded, and the anode 2 is transferred to a part of the other surface of the electrolyte membrane 1 corresponding to the reaction area. The part of the other surface of the electrolyte membrane 1 corresponding to the reaction area to which the anode 2 is transferred is opposite to the part of the surface of the electrolyte membrane 1 corresponding to the reaction area to which the cathode 3 is bonded.

The anode 2 is not heat-treated, the MEA 10 configured such that the cathode 3 and the anode 2 are bonded to both surfaces of the electrolyte membrane 1 is manufactured, and the sheet of the electrolyte membrane 1 is wound on a winding roll 24 and stored after the transfer process of the anode 2 has been completed.

The MEA 10 manufactured by the above-described manufacturing process has a configuration in which the cathode 3 and the sub-gasket 4 are bonded to one surface of the electrolyte membrane 1 and the anode 2 is bonded to the other surface of the electrolyte membrane 1. The release paper 9, from which the anode 2 is released while passing through the transfer device, is wound on a winding roll which is not shown.

As described above, in embodiments of the present invention, the MEA 10 is manufactured through the partial heat treatment process by simultaneously performing both drying and heat treatment of only the cathode 3 after application of the catalyst slurry 3a and may thus have improved withstand reverse voltage performance compared to an MEA which does not undergo the partial heat treatment process.

Further, during the process of manufacturing the MEA 10 according to embodiments of the present invention, the cathode 3 is manufactured by performing heat treatment of the cathode 3 as a post-treatment simultaneously with drying of the catalyst slurry 3a after application of the catalyst slurry 3a so that durability of the cathode 3 may be improved, and the anode 2 is bonded to the electrolyte membrane 1 through transfer without heat treatment, because, when the anode 2 is heat-treated, withstand reverse voltage performance may be reduced due to low accessibility of a reactant (water) to a withstand reverse voltage catalyst caused by improvement in crystallinity of the electrode and increase in hydrophobicity of the electrode.

As described above, in embodiments of the present invention, the MEA 10 is manufactured through the continuous process in which application and drying of the catalyst slurry 3a and heat treatment of the cathode 3 are integrated, and thereby, the porosity and electrode structure of the MEA 10 may be ideally implemented.

Further, in embodiments of the present invention, the sub-gasket 4 is applied only to one surface of the electrolyte membrane 1, and thereby, manufacturing costs may be reduced and occurrence of water bubbles may be improved.

In more detail, after the catalyst slurry 3a for manufacturing the cathode 3 has been directly applied onto the electrolyte membrane 1 having the sub-gasket 4 bonded thereto, only the cathode 3 is heat-treated, and thereby, the withstand reverse voltage performance of the MEA 10 may be improved.

Deterioration of the withstand reverse voltage performance of the anode 2 due to heat treatment of the MEA 10 may be improved by performing heat treatment of only the cathode 3 and, when heat treatment of the anode 2 is not performed, the crystallinity of the anode 2 may be reduced, and thus the anode 2 may be hydrophilized, may increase accessibility of water to the withstand reverse voltage catalyst, and may increase water electrolysis.

Further, the manufacturing time of the MEA 10 may be shortened by integrating the heat treatment process of the cathode 3 and the drying process of the catalyst slurry 3a, and the porosity and electrode structure of the MEA 10 may be ideally implemented by controlling the cooling rate of the cathode 3 using the temperature control plates.

Moreover, the MEA 10 may be manufactured through the continuous process after bonding of the sub-gasket 4 only to one surface of the electrolyte membrane 1, and thereby, manufacturing costs may be reduced and occurrence of water bubbles may be improved.

In the process of manufacturing the MEA according to embodiments of the present invention, the cathode is manufactured by applying and coating the catalyst slurry onto the surface of the electrolyte membrane exposed by the opening formed in the sub-gasket.

Therefore, the inner space of the opening of the sub-gasket and the surface of the electrolyte membrane exposed by the opening may be used as a casting mold for coating of the catalyst slurry for manufacturing the electrode (i.e., the cathode), and in this case, the height of the opening, that is, a height difference between the sub-gasket and the electrolyte membrane, may be used.

Further, as the casting process of the cathode, application and drying of the catalyst slurry and heat treatment of the cathode may be almost simultaneously performed, interfacial resistance between the electrolyte membrane and the cathode may be reduced by applying the catalyst slurry for manufacturing the cathode directly onto the surface of the electrolyte membrane and performing heat treatment of the cathode, and a process time may be shortened by integrating the existing transfer process and heat treatment process of the cathode.

In addition, the heat treatment process may be delicately controlled by adjusting the positions of the temperature control plates and the length and feeding rate of the conveyor belt so as to perform a continuous process.

Although the above-described embodiments of the present invention describe that the cathode is manufactured by applying the catalyst slurry directly onto the electrolyte membrane, drying the catalyst slurry, and performing a heat treatment, and the anode is bonded to the electrolyte membrane by the transfer method, the cathode and the anode may be manufactured in the opposite way.

That is, the anode is manufactured by applying the catalyst slurry directly onto the electrolyte membrane, drying the catalyst slurry, and performing a heat treatment, and the cathode is bonded to the electrolyte membrane by the transfer method.

As is apparent from the above description, a method and apparatus for manufacturing an MEA according to embodiments of the present invention may improve the withstand reverse voltage of the MEA, may reduce manufacturing costs, may shorten a manufacturing time, and may improve occurrence of water bubbles.

Further, in embodiments of the present invention, a continuous process, in which drying of a catalyst slurry for manufacturing a cathode and heat treatment of the cathode are integrated, is performed, thereby being capable of ideally implementing the porosity and electrode structure of the MEA.

Embodiments of the invention have been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane-electrode assembly, the method comprising:
    feeding an electrolyte membrane by a feeding device;
    applying a catalyst slurry to manufacture a first electrode onto a surface of the electrolyte membrane by an applicator, while feeding the electrolyte membrane by the feeding device;
    performing drying of the catalyst slurry and heat treatment of the first electrode by applying heat to the electrolyte membrane by temperature control devices, while feeding the electrolyte membrane by the feeding device; and
    transferring a second electrode to a remaining surface of the electrolyte membrane discharged from the feeding device, opposite to the surface of the electrolyte membrane having the first electrode bonded thereto, by a transfer device.

2. The method of claim 1, wherein the first electrode is a cathode and the second electrode is an anode.

3. The method of claim 1, wherein the feeding device comprises a conveyor belt system that feeds the electrolyte membrane using a conveyor belt.

4. The method of claim 1, wherein:
    the temperature control devices comprise:
        a heater that applies heat to the electrolyte membrane; and
        a cooler that cools the electrolyte membrane after the heat treatment; and
    the heater and the cooler are disposed on a feeding route of the electrolyte membrane fed by the feeding device.

5. The method of claim 4, wherein:
    the heater comprises heating wires installed in a hot plate; and
    the cooler comprises cooling wires installed in a cool plate.

6. The method of claim 5, wherein the cooling wires pass a cooling fluid therethrough.

7. The method of claim 1, wherein:
    the temperature control devices comprise a heater; and
    the heater is configured to apply heat to the electrolyte membrane in a section in which the catalyst slurry is applied to the surface of the electrolyte membrane and a section in which the drying of the catalyst slurry and the heat treatment of the first electrode are performed.

8. The method of claim 7, wherein the heater comprises heating wires installed in a hot plate.

9. The method of claim 1, wherein:
    the feeding device comprises a conveyor belt system configured to feed the electrolyte membrane using a conveyor belt; and
    the temperature control devices are installed under the conveyor belt.

10. The method of claim 1, wherein:
    in feeding the electrolyte membrane, the fed electrolyte membrane is in a state in which a sub-gasket having an opening formed therein is bonded to the surface of the electrolyte membrane; and
    in applying the catalyst slurry, the catalyst slurry is applied to the surface of the electrolyte membrane exposed by the opening.

11. An apparatus for manufacturing a membrane-electrode assembly, the apparatus comprising:
    a feeding device configured to feed an electrolyte membrane;
    an applicator configured to apply a catalyst slurry configured to manufacture a first electrode onto a surface of the electrolyte membrane, while the electrolyte membrane is fed by the feeding device;
    temperature control devices configured to simultaneously perform drying of the catalyst slurry and heat treatment of the first electrode by applying heat to the electrolyte membrane, while the electrolyte membrane is fed by the feeding device; and
    a transfer device configured to transfer a second electrode to a remaining surface of the electrolyte membrane discharged from the feeding device, opposite to the surface of the electrolyte membrane having the first electrode bonded thereto.

12. The apparatus of claim 11, wherein:
    the first electrode is a cathode; and
    the second electrode transferred is an anode.

13. The apparatus of claim 11, wherein the feeding device comprises a conveyor belt system configured to feed the electrolyte membrane using a conveyor belt.

14. The apparatus of claim 11, wherein:
    the temperature control devices comprise:
        a heater configured to apply heat to the electrolyte membrane; and
        a cooler configured to cool the electrolyte membrane after the heat treatment; and
    the heater and the cooler are disposed on a feeding route of the electrolyte membrane fed by the feeding device.

15. The apparatus of claim 14, wherein:
    the heater comprises heating wires disposed in a hot plate; and
    the cooler comprises cooling wires disposed in a cool plate.

16. The apparatus of claim 15, wherein the cooling wires are configured to pass a cooling fluid therethrough.

17. The apparatus of claim 11, wherein:
    the temperature control devices comprise a heater; and
    the heater is configured to apply heat to the electrolyte membrane in a section in which the catalyst slurry is applied to the surface of the electrolyte membrane and in a section in which drying of the catalyst slurry and the heat treatment of the first electrode are performed.

18. The apparatus of claim 17, wherein the heater comprises heating wires disposed in a plate.

19. The apparatus of claim 11, wherein:
the feeding device comprises a conveyor belt system configured to feed the electrolyte membrane using a conveyor belt; and
the temperature control devices are disposed under the conveyor belt.

20. The apparatus of claim 11, wherein the transfer device comprises a pair of pressing rolls configured to allow the electrolyte membrane discharged from the feeding device and a release paper having the second electrode fixed thereto to pass through a gap between the pair of pressing rolls so as to transfer the second electrode to the remaining surface of the electrolyte membrane, opposite to the surface of the electrolyte membrane having the first electrode bonded thereto, by compression.

\* \* \* \* \*